US005795643A

United States Patent [19]

Steininger et al.

[11] Patent Number: 5,795,643

[45] Date of Patent: Aug. 18, 1998

[54] ANTICOPYING FILM

[75] Inventors: Helmut Steininger, Worms; Peter Heilmann, Bad Durkheim, both of Germany; Peter Hewkin, Cambridge, Great Britain

[73] Assignee: BASF Magnetics GmbH, Mannheim, Germany

[21] Appl. No.: 381,907

[22] PCT Filed: Oct. 16, 1993

[86] PCT No.: PCT/EP93/02860

§ 371 Date: Feb. 13, 1995

§ 102(e) Date: Feb. 13, 1995

[87] PCT Pub. No.: WO94/09990

PCT Pub. Date: May 11, 1994

[30] Foreign Application Priority Data

Oct. 29, 1992 [DE] Germany .......................... 42 36 563.5

[51] Int. Cl.$^{6}$ ................................ B32B 3/28; G03C 1/00; B42D 15/00

[52] U.S. Cl. .......................... 428/143; 428/148; 428/163; 428/168; 428/172; 428/173; 428/206; 428/207; 428/913; 428/916; 283/72; 283/902; 430/496

[58] Field of Search ..................... 283/72, 902; 428/167, 428/172, 211, 143, 29, 148, 163, 168, 173, 199, 207, 206, 913, 916; 430/50, 270, 320, 496

[56] References Cited

U.S. PATENT DOCUMENTS

| | | | |
|---|---|---|---|
| 3,887,742 | 6/1975 | Rennagel | 428/211 |
| 4,025,673 | 5/1977 | Rennagal | 428/29 |
| 4,791,449 | 12/1988 | Foley et al. | 355/3 R |
| 5,204,160 | 4/1993 | Runser | 428/167 |

*Primary Examiner*—Donald Loney
*Attorney, Agent, or Firm*—Keil & Weinkauf

[57] ABSTRACT

An anticopying film or layer consists of a film or of a layer of transparent material having a large number of completely or partially nontransparent regions which are arranged distances apart and whose planes are arranged in about the same predetermined position relative to the surfaces of the film or of the layer so that, from a predetermined viewing angle onto the surfaces of the anticopying film, the latter is essentially transparent. The regions consist at least partially of photosensitive material which is converted by the action of radiation into nontransparent or reflecting material, it also being possible to provide, in the transparent plastics material, furrows or grooves in which the photosensitive material is present.

14 Claims, 2 Drawing Sheets

ANTICOPYING FILM

BACKGROUND OF INVENTION

1. Field of Invention

The present invention relates to an anticopying film or layer, consisting of a film or of a layer of transparent material having a large number of partially or completely nontransparent regions which are arranged distances apart and whose planes are arranged in about the same predetermined position relative to the surfaces of the film or of the layer so that, from a predetermined viewing angle onto the surfaces of the anticopying film, the latter is essentially transparent.

2. Description of the Related Art

An anticopying film of the type defined as above is described in U.S. Pat. No. 3,887,742. Such a film, which is intended to permit copy-proof documents, is effective in concealing graphic information and/or characters of a document or a text generally, in the vertical viewing direction as occurs in a copier, and in rendering visible the graphic information and/or characters at a predetermined different viewing angle, relative to the plane of the document.

In practice, such an anticopying film is a transparent plastics film containing nontransparent particles or having a surface which is notched in any manner or has a sawtooth-shaped cross-section, wherein a first oblique or vertical surface is either black or reflecting from a vertical viewing angle, relative to the plane of the film or of the document, and the other oblique surface is transparent at a different viewing angle, so that the information or characters are legible. Such notched or sawtooth-shaped surfaces are very difficult to produce since the surfaces must first be embossed or beaten and the oblique surfaces must then be provided with a black or reflecting material, it being necessary for the accuracy of these operations to be so high that the transparent surfaces do not suffer, ie. are likewise provided partially with black and reflecting material. In a further embodiment, black ink which covers at least a part of the background is provided in the valley between two successive teeth in a film surface having a sawtooth-shaped cross-section. Here too, no practical production processes have been described.

An anticopying medium for written or printed matter is disclosed in AU-A-610 614, wherein the medium contains a photosensitive ink system which, when exposed in a photocopier, renders the text illegible or makes the copy clearly distinguishable from the original, so that either the original becomes worthless or is clearly recognizable as having been copied.

SUMMARY OF INVENTION

It is an object of the present invention to provide an anticopying film or an anticopying layer, which film or which layer is simpler to produce and more economical and prevents or at least complicates copying.

We have found that this object is achieved by an anticopying film or layer for documents, consisting of a film or of a layer of transparent material having a large number of partially or completely nontransparent regions which are arranged distances apart and whose planes are arranged in about the same predetermined position relative to the surfaces of the film or of the layer so that, from a predetermined viewing angle onto the surfaces of the film or of the layer, the anticopying film is essentially transparent, wherein the regions consist partially or completely of a material which is photochemically converted into nontransparent or reflecting material.

This considerably simplifies the production of such a film or layer, and there are advantageous possibilities for variation, depending on the particular desired use.

We have found that the object is furthermore achieved in practice by an anticopying film or layer, consisting of a film or of a layer of transparent material having a large number of partially or completely nontransparent regions which are arranged distances apart and whose planes are arranged in about the same predetermined position relative to the surfaces of the film or of the layer so that, from a predetermined viewing angle onto the surfaces of the film or of the layer, the anticopying film is essentially transparent, if the regions are produced from coextruded transparent and nontransparent plastics material.

The anticopying film or the anticopying layer is thus produced in one operation.

We have found that the object is furthermore advantageously achieved by an anticopying film or layer consisting of a film or of a layer of transparent material having a large number of partially or completely nontransparent regions which are arranged distances apart and whose planes are arranged in about the same predetermined position relative to the surfaces of the film or of the layer so that, from a predetermined viewing angle onto the surfaces of the anticopying film, the latter is essentially transparent, if the regions consist of nontransparent or reflecting strip material which, after extrusion of the transparent material with furrows or grooves, is inserted into said furrows or grooves.

This provides a further advantageous embodiment of such an anticopying film.

In an advantageous embodiment, the nontransparent regions are oblique layers which consist of exposed and, if necessary, developed photosensitive material.

The transparent material consists, for example, of a thick photo emulsion which is partially exposed and then developed.

In this case, the oblique layers are essentially present continuously through the thickness of the film or of the layer.

The transparent material may also consist of a plastic which contains at least one photosensitive substance, and the exposure can be localized and effected in a plane which is oblique relative to the material surface. Developing is not necessary even in this case.

In a further embodiment, the film or the layer may be provided, in at least one surface, with a large number of roughly parallel and roughly equidistant furrows or grooves, into which the one or more photosensitive substances are introduced.

The furrows or grooves may be arranged at right angles or obliquely to the film or layer surface.

It may also be advantageous in practice if the nontransparent or reflecting regions are formed as first opaque or reflecting layers on the upper surface of the film or of the layer and as second opaque layers, arranged horizontally staggered with respect to the first opaque layers, on the lower surface of the film or of the layer.

BRIEF DESCRIPTION OF DRAWINGS

Embodiments of the invention are described below with reference to schematic drawings.

DETAILED DESCRIPTION

For the purposes of the present invention, photochemically convertible material is any photosensitive material which changes in its physical properties as a result of the action of radiation (photons, corpuscles), in this case from a transparent to an opaque state.

Figure 1A:
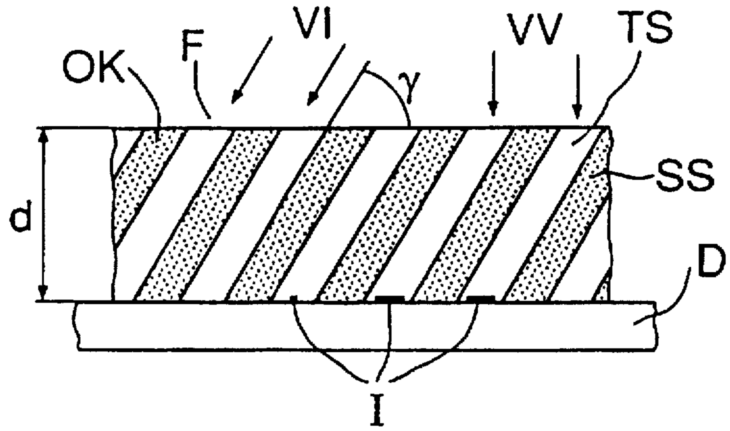
FIG. 1A shows an anticopying film having opaque oblique layers

FIG. 1A shows an anticopying film F or an anticopying layer consisting of transparent plastics material in which a number of parallel equally spaced oblique layers SS are provided, the layers SS being present continuously through the total thickness d of the anticopying film F.

The plastics material preferably contains photosensitive substances which are reactive in incident light of a specific wavelength and render the affected regions opaque.

The action of light can be localized by means of masks to the predetermined regions of the oblique layers, or arrays or a matrix can ensure limited incident light. Such arrays may be photodiode or diffraction grating arrangements which make it possible to produce a large number of light sources. However, it is also possible to use a locally controlled laser beam or a plurality thereof. The radiation should be obliquely incident in order to be able to form the oblique layers SS at the predetermined angle γ of from about 30° to about 73°, in particular from about 45° to about 60°. At the angle γ or in the direction of view indicated by the arrow VI, the information I of the document D is visible through the transparent layers TS. In the direction of arrows VV, however, the information I is concealed and invisible.

The opacity of the layers SS must therefore be chosen so that the information in any case is at least unclearly recordable by commercial copiers and cannot be read from the copy by people.

Figure 1B:
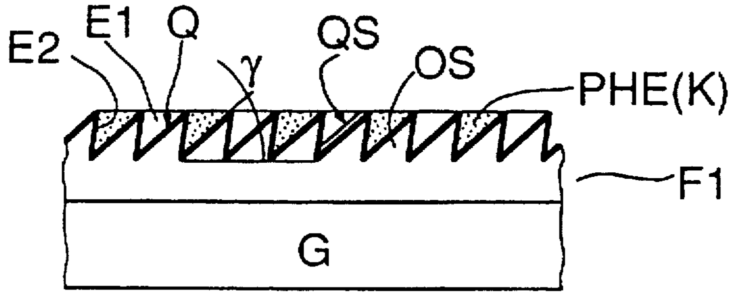
FIG. 1B shows an anticopying film having a sawtooth cross-section at the surface

FIG. 1B shows an anticopying film F1 or an anticopying layer having a surface OS which possesses a sawtooth-shaped cross-section. One sidewall of the sawtooth shape is arranged, for example, at an angle γ and the other is roughly vertical. The triangular furrows E are in turn filled with plastic PH containing photosensitive material, for example every second furrow E2 being opaque (PHE) and every first furrow E1 remaining roughly transparent as a result of localized incident light, as described above. The oblique surfaces Q may be optically formed such that the total reflection occurs in the case of radiation at right angles, or they may be formed with a reflecting layer QS. This likewise results in an oblique viewing direction corresponding to the direction VI and a roughly vertical concealment direction VV (FIG. 1).

The film or layer material F1 should be transparent plastics material which is formed either as self-supporting film or as a layer of this type (F1) or is provided with a substrate film or substrate layer G.

The furrows in the surface OS may be embossed or may be formed in the production, for example by extrusion, or mechanically, for example by cutting.

Figure 2A:
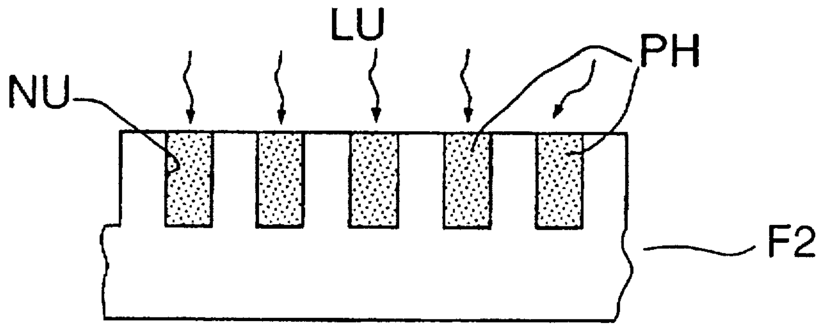
FIG. 2A shows an anticopying film having rectangular grooves and unexposed photosensitive material therein

FIG. 2A shows a further anticopying film F3 or anticopying layer embodiment having longitudinal grooves NU which are roughly rectangular in cross-section and in turn are filled with photosensitive material PH as described above for FIG. 1B. The plastic of the base material is once again transparent and the grooves NU are introduced by the methods described. The material PH is uniformly exposed (arrow LU) and becomes opaque (PHE), as indicated by the shading in FIG. 3A. In this arrangement of the grooves NU, only partial information PI can be copied by exposure at right angles VV in the copier, while the additional information PP is visible only at an angle (in this case about 63°).

Thus, only partial concealment is achievable here.

Figure 2B:
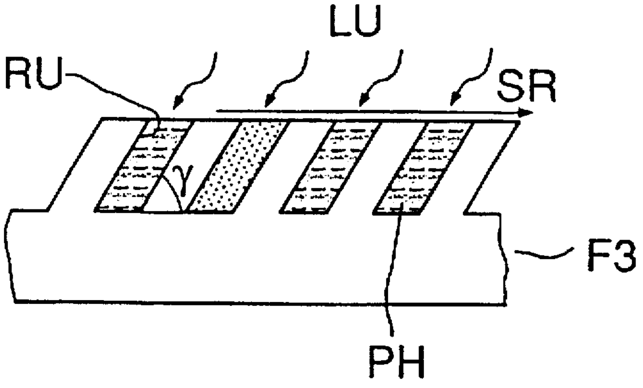
FIG. 2B shows an anticopying film having diamond-shaped grooves according to FIG. 2A

Another embodiment of an anticopying film F3 or anticopying layer, which embodiment is more advantageous in this respect, is shown in FIG. 2B.

Figure 3A:
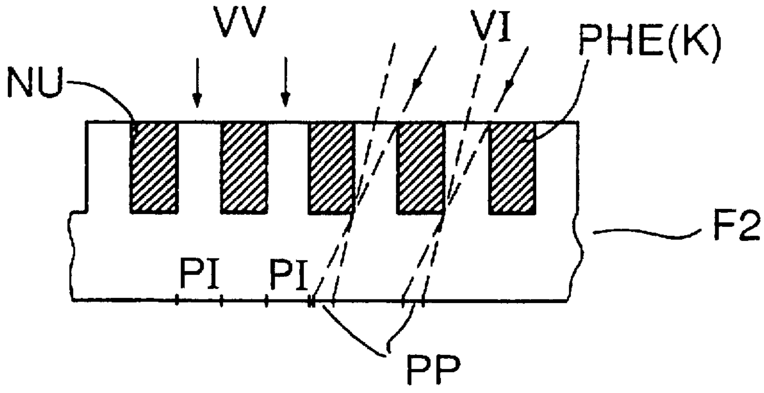
FIG. 3A shows the rectangular grooves from FIG. 2A with exposed, opaque photosensitive material
Figure 3B:
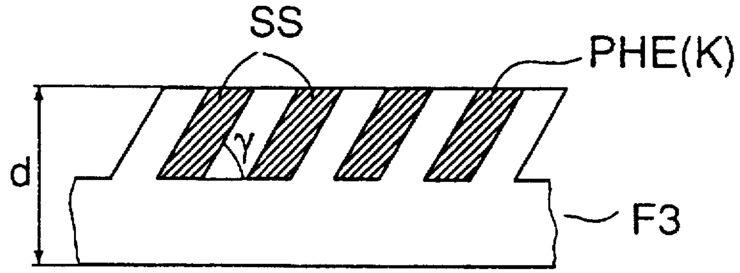
FIG. 3B is a variation of FIG. 3A, wherein the oblique layers SS are set at an angle γ in the manner of FIG. 2B.

The diamond-shaped grooves RU here are either produced as grooves NU (FIG. 2A) and then subjected to a shear stress in the direction SR or are produced in this form by extrusion, cutting, etc. The photosensitive material filling PH is the same and is introduced, for example, by knife coating. After uniform exposure by means of radiation source LU, the finished anticopying film F3 or anticopying layer having opaque oblique layers SS in the angular range γ (see above) is obtained, as shown in FIG. 3A. In the Examples of FIGS. 2 and 3, the grooves NU and RU, respectively, are present through up to about half the thickness d of the film F2 and F3, respectively. They may also be deeper. The depth T of the grooves NU and RU can be formed to correspond roughly to the total thickness d only if a substrate film or substrate layer G, not shown here, is used, to which the layer F2 or F3 is fastened or applied.

Figure 4A:
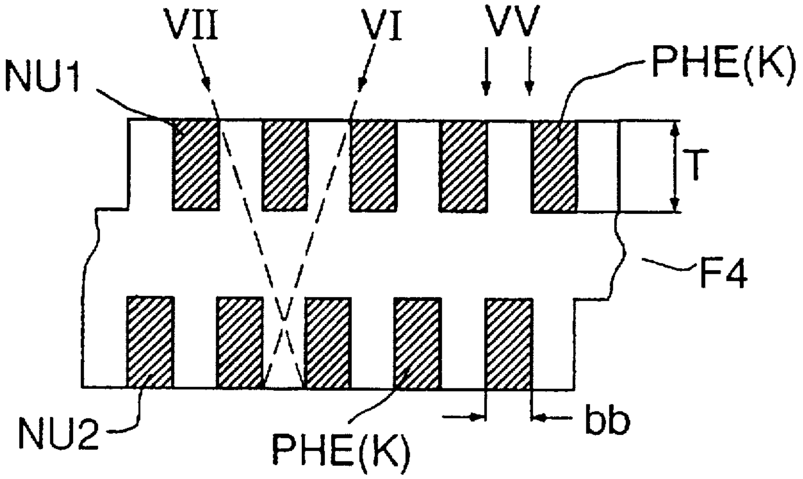
FIG. 4A shows a double-sided groove embodiment according to FIG. 3A

FIG. 4A shows a film F4 or layer provided with rectangular grooves NU on both sides in comparison with F2. The grooves NU1 in the upper surface and NU2 in the lower surface are arranged staggered relative to one another. The opaque groove content is produced, as described above, by means of a photochemical material PH and uniform exposure thereof (PHE).

In the direction VV, the information I is once again completely concealed.

In the directions VI and VII, partial information is visible in each case, the completeness of the visible information increasing with a decrease in the depth T of the grooves NU1 and NU2, independently of the width bb of the individual grooves NU1 and NU2.

Figure 4B:
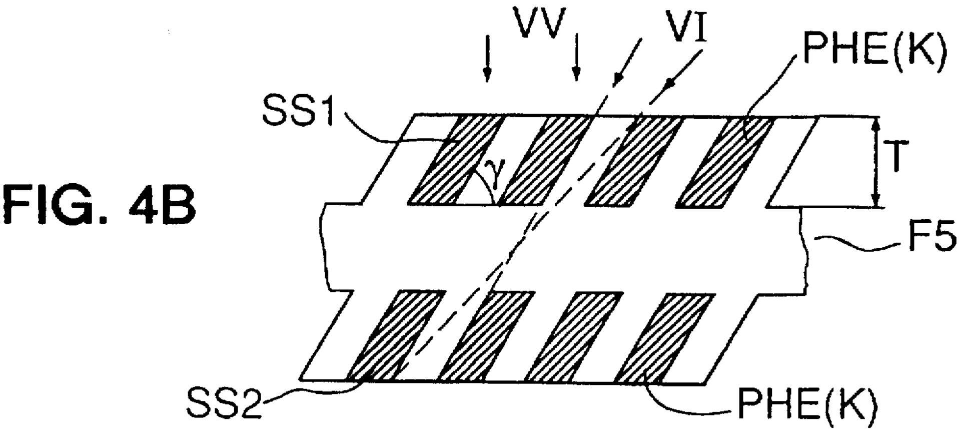
FIG. 4B shows a double-sided groove embodiment according to FIG. 3B.

FIG. 4B shows a film or layer embodiment F5 which corresponds to FIG. 4A and, in contrast to F3, is formed on both sides with oblique layers SS1 and SS2, which can be produced as described above. The oblique layers SS1 and SS2 are arranged horizontally staggered relative to one another.

The information I is concealed in the vertical viewing direction VV and at least partially visible in the oblique direction VI.

The groove or furrow embodiments in FIGS. 1B, 2A and B, 3A and B and 4A and B can also be realized with opaque or reflecting, strip-like inlays K instead of photosensitive grooves or furrow contents.

Said inlays can be inserted into the furrows or grooves, for example directly after extrusion of the furrowed or grooved material.

It is even simpler directly to form the opaque or reflecting strip-like furrow or groove contents by coextruding a transparent plastic and an opaque plastic OK (FIG. 1).

An anticopying film or layer consists of a film or of a layer of transparent material having a large number of completely or partially nontransparent regions which are arranged distances apart and whose planes are arranged in about the same predetermined position relative to the surfaces of the film or of the layer so that, from a predetermined viewing angle onto the surfaces of the anticopying film, the latter is essentially transparent.

The regions consist at least partially of photosensitive material which is converted by the action of radiation into nontransparent or reflecting material, it also being possible to provide, in the transparent plastics material, furrows or grooves in which the photosensitive material is present.

We claim:

1. An anticopying film, consisting of a film of transparent material having a large number of nontransparent or reflecting layers which are arranged essentially equal distances apart and whose planes are arranged essentially parallel to one another and in about the same predetermined position relative to the surfaces of the film on at least one of the surfaces, wherein from a predetermined oblique viewing through angle from about 30° to about 73° onto the surfaces of the anticopying film, the latter is essentially transparent and, and wherein the nontransparent or reflecting layers are formed at least partially from exposed photosensitive material and the nontransparent or reflecting layers are located on the upper and lower surfaces of the anticopying film and are arranged obliquely relative to the surface of anticopying film as to provide for said predetermined oblique viewing angle.

2. An anticopying film as claimed in claim 1, wherein the nontransparent or reflecting layers are formed as oblique layers continuously through the thickness of the film.

3. An anticopying film as claimed in claim 1, wherein the nontransparent or reflecting layers are formed as first opaque or reflecting layers on the upper surface of the film and as second opaque or reflecting layers, arranged horizontally staggered with respect to the first opaque or reflecting layers, on the lower surface of the film as to provide for said predetermined viewing angle.

4. An anticopying film as claimed in claim 1, wherein the film is provided, on at least one surface, with a large number of essentially parallel, essentially equidistant furrows or grooves in which at least one exposed photosensitive substance (PH) is present.

5. An anticopying film as claimed in claim 4, wherein the furrows or grooves are provided at right angles to the film surface.

6. An anticopying film as claimed in claim 4, wherein the furrows or grooves are arranged obliquely to the film surface.

7. An anticopying film as claimed in claim 4, wherein the furrows or grooves have a triangular shape.

8. An anticopying film as claimed in claim 1, wherein the transparent material contains at least one photosensitive substance.

9. An anticopying film, consisting of a film of transparent material having a large number of nontransparent or reflecting layers which are arranged essentially equal distances apart and whose planes are arranged essentially parallel to one another and in about the same predetermined position relative to the surfaces of the film on at least one of the surfaces, wherein from a predetermined oblique viewing angle through onto the surfaces of the anticopying film, the latter is essentially transparent and wherein the film consists of coextruded, transparent plastic and nontransparent or reflecting plastic material, the latter being formed from exposed photosensitive material and form the nontransparent or reflecting layers, which are located on the upper and lower surfaces of the film and are arranged obliquely relative to the surfaces of the anticopying film as to provide for said predetermined viewing through angle.

10. An anticopying film, consisting of a film of transparent material having a large number of nontransparent or reflecting layers which are arranged essentially equal distances apart and whose planes are arranged essentially parallel to one another and in about the same predetermined position relative to the surfaces of the film on at least one of the surfaces, wherein from a predetermined viewing angle through from about 30° to about 73° into the surfaces of the anticopying film, the latter is essentially transparent, and wherein the nontransparent or reflecting layers consist of nontransparent or reflecting strip material which is inserted into furrows or grooves of a coextruded transparent material, the nontransparent or reflecting layers being located on the upper and lower surfaces of the film being arranged obliquely relative to the surface of the film as to provide for said predetermined oblique viewing through angle.

11. An anticopying film as claimed in claim 10, wherein first nontransparent or reflecting layers of strip material are located on the upper surface of the film sand second nontransparent or reflecting layers of strip material are located on the lower surface of the film and said first and second nontransparent reflecting layers are arranged horizontally staggered to one another as to provide for said predetermined viewing through angle.

12. An anticopying film as claimed in claim 1 wherein the predetermined viewing through angle is from about 45° to about 60°.

13. An anticopying film as claimed in claim 9 wherein the predetermined viewing through angle is from about 45° to about 60°.

14. An anticopying film as claimed in claim 10 wherein the predetermined viewing through angle is from about 45° to about 60°.

* * * * *

UNITED STATES PATENT AND TRADEMARK OFFICE

CERTIFICATE OF CORRECTION

PATENT NO.: 5,795,643

DATED: August 18, 1998

INVENTOR(S): STEININGER et al.

It is certified that error appears in the above-identified patent and that said Letters Patent is hereby corrected as shown below:

Col. 5, claim 1, line 24, "and, and" should be --and--.

Col. 6, claim 11, line 37, "sand" should be --and--.

Signed and Sealed this

Twenty-second Day of December, 1998

*Attest:*

BRUCE LEHMAN

*Attesting Officer*

*Commissioner of Patents and Trademarks*